July 10, 1923.  
G. W. WATTS  
SPRING WHEEL  
Filed Nov. 9, 1922

WITNESSES

INVENTOR  
GEORGE W. WATTS,  
BY  
ATTORNEYS

July 10, 1923.  
G. W. WATTS  
SPRING WHEEL  
Filed Nov. 9, 1922
1,461,408
2 Sheets-Sheet 2
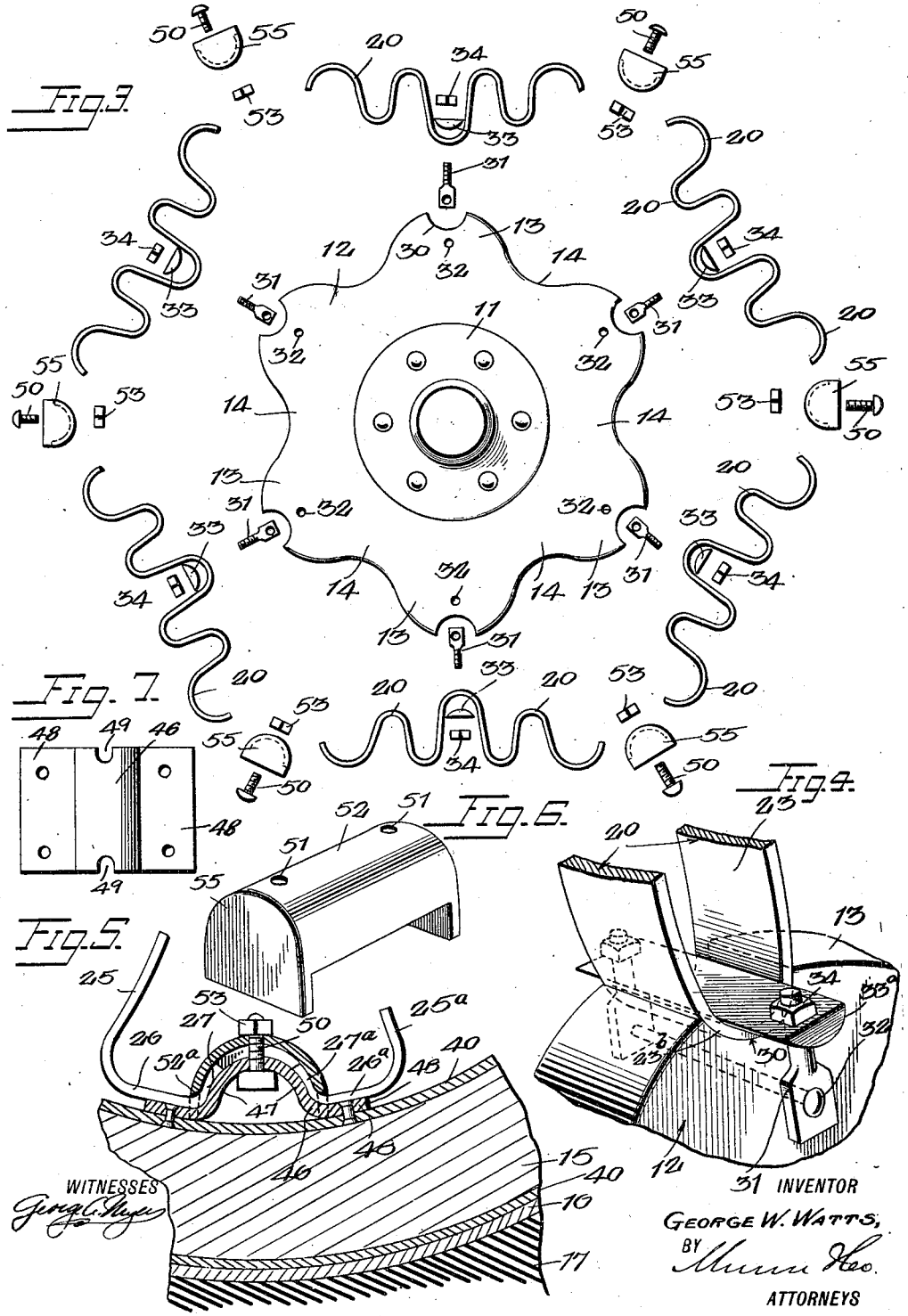

Patented July 10, 1923.

1,461,408

UNITED STATES PATENT OFFICE.

GEORGE WILBER WATTS, OF HOT SPRINGS, ARKANSAS.

SPRING WHEEL.

Application filed November 9, 1922. Serial No. 599,914.

*To all whom it may concern:*

Be it known that I, GEORGE WILBER WATTS, a citizen of the United States, and a resident of Hot Springs, in the county of Garland and State of Arkansas, have invented certain new and useful Improvements in Spring Wheels, of which the following is a specification.

This invention relates to an improvement in spring wheels especially adapted for use with trucks although it is to be understood that the invention may also be advantageously used with motor vehicles generally as well as with other types of vehicles.

The object of the invention is to provide a spring wheel of this character in which the springs are so organized with each other and with the other elements of the wheel that all of the springs are active to support the load and to absorb shocks incident to the travel of the vehicle.

Another important object is to provide an improved means for positively and securely holding or fastening the spring to the body portion of the wheel and to the felly without impairing the flexibility, elasticity or strength of the spring and without the liability of causing crystallization of the springs at points adjacent the fastening means.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 3 is a view in side elevation, showing the parts of the invention prior to assembly;

Figure 4 is a fragmentary view in perspective showing the means for securing the springs to the wheeled body portion;

Figure 5 is a fragmentary view in section, taken in approximately the plane of the wheel, parts being shown in elevation for the sake of illustration;

Figure 6 is a detail perspective view of the cap plate or clamp; and

Figure 7 is a fragmentary view in plan of one of the seats or supports for the spring ends provided upon the felly or ring carrier thereof.

Figure 1:
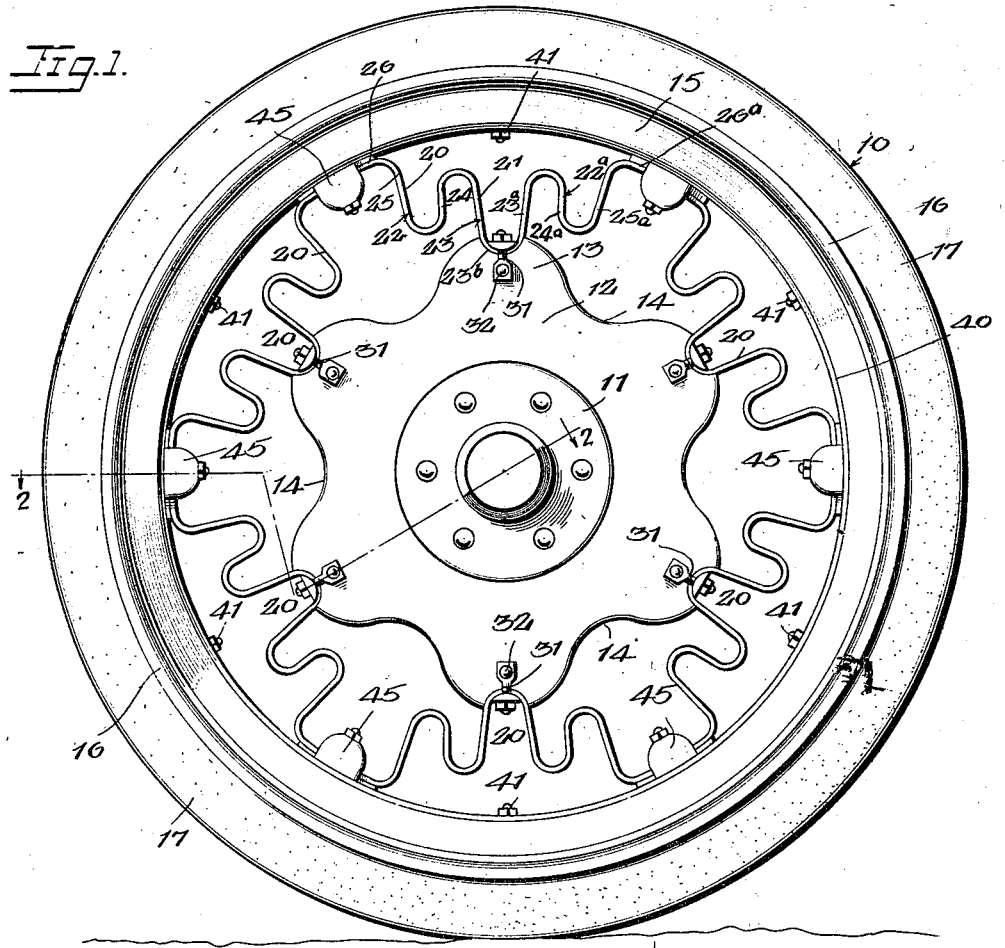
Figure 1 is a view in side elevation, illustrating the preferred embodiment of the invention.
Figure 2:
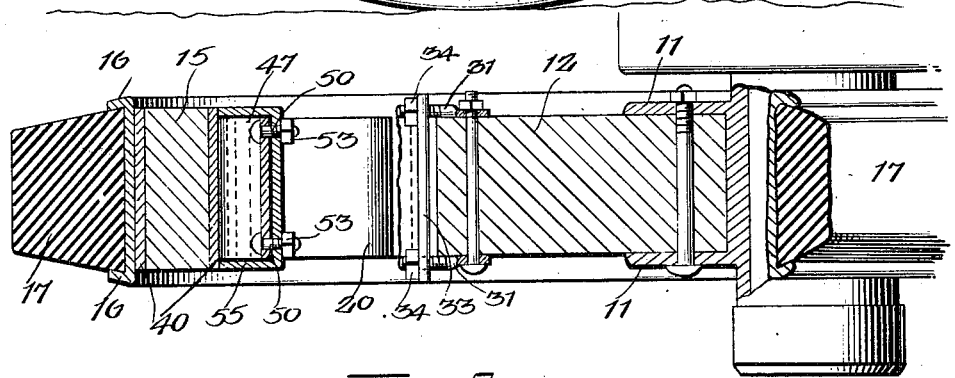
Figure 2 is a view in section on line 2—2 of Figure 1.

Referring to the drawings wherein for the sake of illustration is shown the preferred embodiment of the invention, the numeral 10 designates generally the spring wheel embodied in the present invention. This wheel includes a hub 11 of conventional construction, and upon which a body portion 12 is mounted and fixedly secured. Preferably this body portion 12 comprises a plate of wood or any suitable material having its periphery of sinuous or wavelike form to provide lugs or projections 13 and depressions 14 as clearly shown in Figures 1 and 3. The wheel 10 also includes a felly 15 upon which a rim 16 and a tire 17 are mounted in any conventional or standard manner. The tire 17 may be a solid tire, and preferably is a solid tire when the wheel 10 is used upon motor trucks or other vehicles carrying a heavy load.

A plurality of series of springs 20 are interposed between the felly and the body portion 12 and are organized with the elements of the wheel and with each other in a manner which will hereinafter be fully described. These springs 20 are preferably six in number. The springs 20 are of identical construction and each includes a main U-shaped member 21 and a pair of smaller U-shaped members 22 and $22^a$ arranged one on each side of the U-shaped member 21. The legs 23 and $23^a$ of the U-shaped member 21 are connected to the legs 24 and $24^a$ of the U-shaped members 22 and $22^a$, the other legs 25 and $25^a$ of these U-shaped members 22 having extensions 26 and $26^a$ provided with curved attaching portions 27 and $27^a$ (see Figure 5). As shown in Figure 1 the legs of the U-shaped members extend substantially radially of the wheel in assembly but the connecting portions between the various U-shaped members extend substantially circumferentially of the wheel although bowed as are the body portions of the U-shaped members to give the requisite resiliency.

Each spring 20 has the bowed body portion $23^a$ of its main U-shaped member 23 fixedly secured to the body 12 of the wheel, and for this purpose each projection 13 of the body portion 12 has formed therein a concaved or curved recess 30 conforming to the contour of and snugly fitting the curved body portion 23$^b$ of the U-shaped member 23 of the adjacent spring 20. A radially extending bolt 31 is disposed flush against each side face of the body portion 12 at each recess 30, the radially extending bolts being secured to the body portion 12 of the wheel by a transverse bolt 32. The threaded shanks of the bolts 31 extend through bolt holes or apertures provided therefor in a clamping bar 33. The clamping bar 33 extends across the body portion 23$^b$ of the U-shaped member 23 of the adjacent spring 20 and the underface of this clamping bar 33 is transversely curved, as at 33$^a$ so as to snugly fit in and engage the body portion 23$^a$. The shanks of the bolts 31 project upwardly beyond the clamping bar 33, and these projecting portions have threaded thereon nuts 23 which coact with the bolts 31 and with the clamping bar 33 to urge the same into clamping engagement with the body portion 23$^b$ of the U-shaped members 23 to firmly clamp the body portions 23$^b$ in the recesses 30 so as to associate each spring 20 with the body portion 12 of the wheel. It is to be noted that this rigid and positive securing action is had without impairing the strength of the spring and without detracting from its resiliency or tending to cause crystallization of the metal of the springs at points adjacent the fastening means.

The ends of the springs are positively and securely clamped to the felly. This clamping may be carried out directly with respect to the felly if desired but preferably the ends are clamped in a manner which will be presently described to the carrier 40 preferably in the form of a ring or annular band secured to the inner peripheral face of the felly 15 by bolts and nuts 41. A common means is provided for clamping the ends of adjacent springs and where six springs are employed six such clamping means must be utilized. The clamping means are each designated at 45 and as all of such clamping means are of identical construction a common description will serve for all. Each of the clamping means 45 includes a seat or support 46 having oppositely curved walls 47 which the curved ends 27 of the adjacent springs engage. The seats 46 also have attaching portions 48 riveted or brazed to the ring carrier 40. The ends of the top or crown portion of the seat 46 are notched, as at 49, to receive the shanks of bolts 50. The heads of the bolts 50 engage the underside of the crown or top portion of the sides 46 around said notches whereby upward displacement of the bolts is prevented. The bolts 50 also extend up through bolt holes 51 provided therefor in clamps or caps 52 which are fitted down over and engage the curved ends 27 of the adjacent springs, as clearly shown in Figure 5. Nuts 53 are threaded on the ends of the bolts 50 which project beyond the bolt holes 51 in the cap 52 and engage the cap 52 to force the same down into clamping engagement with the curved ends 27 of the springs 20, so as to cause the seat 46 and the cap to come into binding engagement with these ends 27 so as to firmly, rigidly and positively secure the same to the felly. The cap 52 includes end plates 55 which engage the sides of the seat 46 to prevent lateral displacement. These end plates 55 may be extended to engage the ring 40 if desired. The edges of the cap 52 are beveled, as at 52$^a$ so as not to interfere with the flexion of the spring.

With the spring wheel constructed and arranged as thus described the six springs employed are highly organized with each other and with the other parts of the wheel. As will be understood from an inspection of Figure 1 all of the springs are active when the wheel is subjected to a load. The spring 20 disposed immediately below the hub is subjected to compression. The springs 20 disposed below and at each side of the hub are subjected partly to compression and partly to tension. Similarly the springs disposed above each side of the hub are exposed partly to compression and partly to tension whereas the spring disposed directly above the hub is subjected entirely to tension. In this manner there is in each spring set up constantly changing stresses which act differently upon the spring and take advantage of these different properties to give to the wheel the desired resiliency and to support the load. With such an arrangement although all of the springs are active to support the load and to give resiliency to the wheel they are not liable to become deformed or have their efficacy impaired because of being constantly subjected to an unchanging force or stress. Moreover the manner in which the springs are organized with body portion 12 and the felly enhances their action and enhances the resiliency of the wheel. The means employed for clamping the ends of the springs to the felly does not impair the strength of the springs since it is not necessary to form bolt holes in these ends or otherwise disturb their structure and at the same time flexion of the spring proper is not interfered with. The same is true of the means for fastening the springs to the hub, the concaved recesses and the clamping bar firmly and positively holding the springs to the body portion 12 but in nowise interfering with flexion or proper action of the springs.

I claim:

1. In a spring wheel, a hub, a body portion secured thereto, a felly, a ring carrier, means for securing the ring carrier to the felly, a plurality of springs interposed between the ring carrier and the felly, each of said springs including a main U-shaped member, and a small U-shaped member arranged at each side of the main U-shaped member, the legs of the main U-shaped member being connected with one leg of each small U-shaped member, the other legs of the small U-shaped members being extended and being curved to constitute attaching ends and being disposed flush against the ring carrier, means for fastening the curved body portion of each main U-shaped member to the body portion of the wheel, and a common means for securing the adjacent attaching ends of the springs to the ring carrier.

2. In a spring wheel, a hub, a body portion secured thereto, a felly, a ring carrier, means for securing the ring carrier to the felly, a plurality of springs interposed between the ring carrier and the felly, each of said springs including a main U-shaped member, and a small U-shaped member arranged at each side of the main U-shaped member, the legs of the main U-shaped member being connected with one leg of each small U-shaped member, the other legs of the small U-shaped members being extended and being curved to constitute attaching ends, means for fastening the curved body portions of the main U-shaped members to the body portion of the wheel, said body portion having a concaved recess receiving the bowed body portion, a clamping bar spanning and engaging the bowed body portion of the main U-shaped member, and means for urging said clamping bar into engagement with said bowed body portion, and a common means for securing the adjacent ends of the springs of the ring carrier and including a seat secured to the ring carrier and having oppositely curved walls which the curved ends of adjacent springs engage, a clamping cap superposed on and engaging the curved ends, and bolts and nuts coacting with the seat and with the clamping cap.

3. In a spring wheel, a hub, a wheel body portion mounted on the hub and having its periphery of sinuous form to provide projecting lugs and depressions intermediate said projecting lugs, said projecting lugs being formed with concaved recesses, a felly and springs interposed between the felly and the body portion, the ends of the springs being secured to the felly, springs having curved portions received in the concaved recesses of the body portion of the wheel, means for clamping said curved portion in said concaved recesses including a clamping bar having a curved portion engaging the curved body portion of the spring.

4. In a spring wheel, a hub, a wheel body portion mounted on the hub, a felly, a ring carrier secured to the felly, a plurality of springs interposed between the ring carrier and the wheel body portion, means for securing the spring intermediate their ends to the wheel body portion, and means for securing the ends of the springs to the ring carrier including a seat secured to the ring carrier and having oppositely curved walls, the ends of the springs being curved and being fitted against said oppositely curved walls, the seat being notched at its ends, a clamp fitting over the curved ends of the spring and having end plates engaging the seat for preventing lateral displacement, bolts having heads engaged with the notched portions of the seat, the clamping cap having bolt holes through which said bolts project and nuts threaded on the bolts and engaging the clamping cap for urging the same in clamping engagement with the ends of the spring.

GEORGE WILBER WATTS.